United States Patent [19]

Howard et al.

[11] Patent Number: 4,848,987
[45] Date of Patent: Jul. 18, 1989

[54] VORTEX MOTION PHASE SEPARATOR FOR ZERO GRAVITY LIQUID TRANSFER

[75] Inventors: Frank S. Howard, Indian Harbour Beach, Fla.; Wilson M. Fraser, Jr., Houston, Tex.

[73] Assignee: Administrator, National Aeronautics and Space Administration, Washington, D.C.

[21] Appl. No.: 232,734

[22] Filed: Aug. 16, 1988

[51] Int. Cl.$^4$ .............................................. B01D 19/00
[52] U.S. Cl. ...................................... 55/160; 55/182; 55/205; 141/45
[58] Field of Search ............... 55/159, 160, 182, 204, 55/205; 141/34, 45

[56] References Cited

U.S. PATENT DOCUMENTS

| | | | |
|---|---|---|---|
| 3,130,022 | 4/1964 | Clarck | 55/182 |
| 3,318,073 | 5/1967 | Adkins | 55/204 X |
| 3,744,738 | 7/1973 | Howard | 244/155 |

OTHER PUBLICATIONS

Article entitled "Preliminary results for a vortex induced, liquid handling and accountability procedure at zero gravity", Presented at Helium Transfer in Space Workshop, Boulder, Colo. in Aug. 1985.

*Primary Examiner*—Charles Hart
*Attorney, Agent, or Firm*—James O. Harrell; John R. Manning; Charles E. B. Glenn

[57] ABSTRACT

A vortex motion phase separator for transferring a liquid in a zero gravity environment while at the same time separating the liquid from vapors found within either the sender or the receiving tanks. The separator comprises a rigid sender tank having a circular cross-section and rigid receiver tank having a circular cross-section. A plurality of ducts connects the sender tank and the receiver tank. Disposed within the ducts connecting the receiver tank and the sender tank is a pump and a plurality of valves. The pump is powered by an electric motor and is adapted to draw either the liquid or a mixture of the liquid and the vapor from the sender tank. Initially, the mixture drawn from the sender tank is directed through a portion of the ductwork and back into the sender tank at a tangent to the inside surface of the sender tank, thereby creating a swirling vortex of the mixture within the sender tank. As the pumping action increases, the speed of the swirling action within the sender tank increases creating an increase in the centrifugal force operating on the mixture. The effect of the centrifugal force is to cause the heavier liquid to migrate to the inside surface of the sender tank and to separate from the vapor. When this separation reaches a predetermined degree, control means is activated to direct the liquid conveyed by the pump directly into the receiver tank. At the same time, the vapor within the receiver tank is directed from the receiver tank back into the sender tank. This flow continues until substantially all of the liquid is transferred from the sender tank to the receiver tank.

7 Claims, 3 Drawing Sheets

VORTEX MOTION PHASE SEPARATOR FOR ZERO GRAVITY LIQUID TRANSFER

ORIGIN OF THE INVENTION

The invention described herein was made by employees of the U.S. Government, and may be manufactured and used by or for the Government for Governmental purposes without the payment of any royalties thereon or therefor.

BACKGROUND OF THE INVENTION

This invention relates to a vortex motion phase separator for liquid transfer in a zero gravity environment.

Heretofore, the transfer of liquid from one container to another in a zero gravity environment has been accomplished by the use of a bladder. Bladders are not considered suitable for cryogenic liquids because of insufficient flexibility at cryogenic temperatures.

Transfer can also be accomplished in a zero gravity environment where the container is being accelerated by rocket engines and the tank is being pressurized with inert gas to force the liquid out. However, this known pressurization technique will not work satisfactorily when the container is not experiencing acceleration because, without any gravitational or acceleration force, globules of the liquid merely collect in various areas of the container and are not forced out by the inert gas.

Another disadvantage in using inert gas to force the liquid from the container is that such is added to the weight of the container due to the requirement for storing the inert gas. There also has to be some means for regulating the pressurized gas in order to prevent overpressurization of the containers.

The main problem in transferring a liquid in a gravity-free environment is that the liquid will separate into globules and will float throughout the container. While it is possible to accelerate and decelerate the container in order to collect and transfer the liquid, it is not practical to do so since it requires the use of the engines of the space vehicle and the consumption of fuel for operating such engines in order to provide such acceleration or to decelerate the container.

One attempt to resolve this problem is found in U.S. Pat. No. 3,744,738 issued to applicant on July 10, 1973. The liquid transfer device disclosed in this patent overcomes most of these problems by providing a transfer screen which is contained within the sender tank. The transfer screen includes a spiral-shaped member carried within the sender tank having a longitudinal axis in alignment with the exit port of the sender tank from which the liquid is being carried. The spiral-shaped member has a diameter corresponding to the internal diameter of the sender tank, and means are provided for rotating the spiral-shaped member so that the pressure created by the rotating screen pushes the liquid in the sender tank out, the exit port. A perforated screen is used so that when a back pressure is created which is greater than the pressure that the spiral-shaped screen member can withstand, the perforations in the screen member allow the liquid to pass through the spiral-shaped screen member, thereby minimizing the back pressure. The disadvantage of the device in this patent is that it requires hardware to be disposed within the tanks which is difficult to maintain and the screens within the tank add weight to the vehicle when it is in a gravity environment.

OBJECTS OF THE INVENTION

Accordingly, it is an important object of the present invention to provide a liquid transfer mechanism for transferring liquid in a zero gravity environment, in particular in outer space.

Another important object of the present invention is to provide a liquid transfer device which utilizes no moving parts contained within the containers or tanks themselves.

Another important object of the present invention is to provide a liquid transfer device which also separates the liquid from the vapor contained within the tanks.

SUMMARY OF THE INVENTION

The above objects are accomplished by the present invention which comprises a sender tank and a receiver tank. A first duct is connected to the sender tank at a tangent to the inner surface of the tank at one end of the duct. The other end of the duct is connected to a pump. A first control valve is located in the first duct between the pump and the sender tank.

A second duct is connected to the pump on the outlet side thereof at one end and the other end is connected at a tangent to the receiver tank. A second control valve is disposed within the second duct between the pump and the receiver tank.

A third duct has one end connected tangentially with the sender tank, and its other end enters the receiver tank and opens adjacent the center of the receiver tank. A third control valve is located in the third duct between the sender tank and the receiver tank.

A fourth duct has one end connected to the outlet side of the pump and its other end is connected with the third duct at a point between the third valve means and the sender tank. A fourth control valve is disposed within the fourth duct between its intersection with the third duct and the outlet end of the pump.

In operation, a mixture of liquid and vapor is contained within the sender tank. When it is desired to transfer the liquid from the sender tank to the receiver tank, the pump operation is initiated with the second and third control valves closed. Thus, as the pump operates to draw both liquid and vapor from the sender tank, the mixture traverses the first duct, the fourth duct and a portion of the third duct, whereupon it re-enters the sender tank at a tangent which tends to create a vortex within the sender tank. As the pump operations continue, the velocity of the vortex within the sender tank increases to the point that the liquid (which has a greater mass density) tends to separate from the vapor and to move outwardly by centrifugal force to concentrate along the inner surface of the sender tank wall. As this velocity increases, the separation between the vapor and the liquid becomes more complete.

After a predetermined velocity has been achieved in the sender tank, the second and third valves are opened and the fourth valve is closed so that the liquid which is spinning in the vortex about the inner surface of the sender tank is now pumped directly into the receiver tank at a tangent to the inside surface of the tank, thereby creating a vortex within the receiver tank which causes the liquid to swirl about the inside surface of the receiver tank wall. At the same time, vapor within the receiver tank is exhausted through the third duct and returned to the sender tank where it continues to keep the vortex spinning within the sender tank. After the majority of the liquid has been transferred from the sender tank to the receiver tank, the first control valve is closed and the operation of the pump ceases. At the same time the second and third control valves are also closed to retain the liquid within the receiver tank.

BRIEF DESCRIPTION OF THE DRAWINGS

Other objects and advantages of this invention will become apparent from a reading of the following detailed description and appended claims taken in conjunction with the accompanying drawings, wherein:

DETAILED DESCRIPTION OF THE INVENTION

Figure 1:
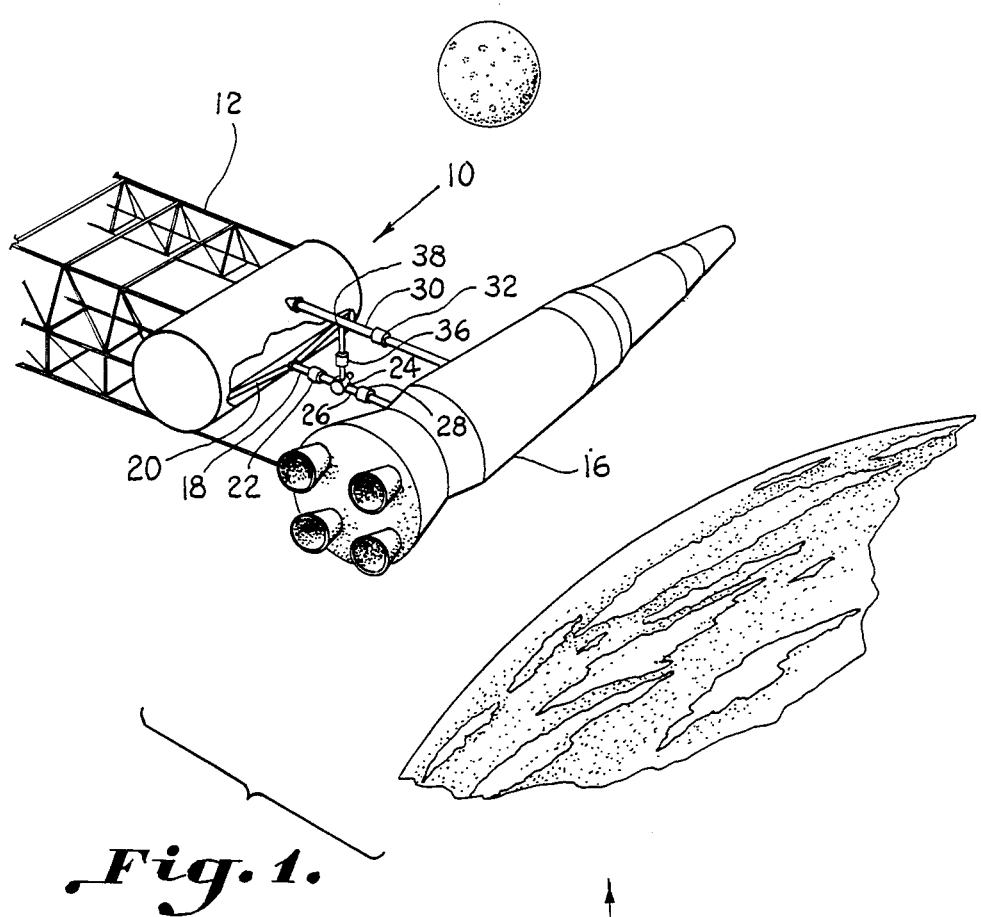
FIG. 1 is a perspective view illustrating the invention in outer space connected to a satellite.

Referring now to FIG. 1 wherein a vortex motion phase separator 10, constructed in accordance with the invention, is supported by a portion of a satellite 12 in outer space. The vortex motion phase separator 10 comprises a sender tank 14 and a receiver tank 16. Connected to sender tank 14 is a first duct 18. One end of the first duct 18 enters sender tank 14 at a tangent to its inner surface and terminates in a funnel-shaped inlet within sender tank 14. Between sender tank 14 and the first duct 18 is a flow funnel 20.

The other end of first duct 18 is connected to the input side of a pump 24 and disposed within first duct 18 is a first control valve 22 located between pump 24 and the sender tank 14.

A second duct 26 has one of its ends connected to the output side of pump 24 and its other end enters receiver tank 16 at a tangent to the inner surface of receiver tank 16. Disposed within the second duct 26, between the pump and the receiver tank, is a second control valve 28.

A third duct 30 has one end connected to the sender tank at a tangent to the inner surface of said tank and its other end extends into the receiver tank 16 and opens near the center of tank 16. Disposed within third duct 30, between the sender and the receiver tanks, is a third control valve 32.

A fourth duct 34 has one of its ends connected to the output side of pump 24 and the other end intersects third duct 30 at a point between third control valve 32 and sender tank 14.

Figure 2:
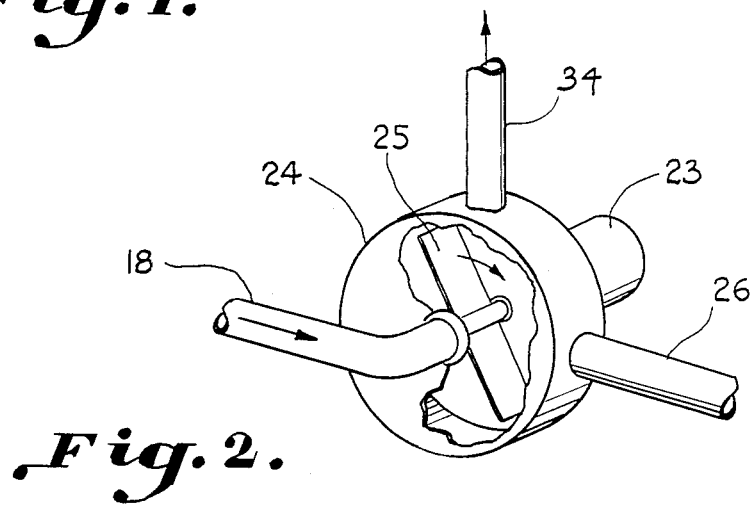
FIG. 2 is an enlarged perspective view of the pump of the invention.

Referring now to FIG. 2, wherein pump 24 is illustrated and is provided with an electric motor 23 for operating an impeller 25. The operation of impeller 25 tends to create a vacuum within first duct 18 thereby first drawing the mixture contained within sender tank 14 into the pump 24. While an impellertype pump is illustrated in FIG. 2, it will be understood that any type of pump may be used, provided such pump will create the desired vacuum within first duct 18. The characteristics of such pumps are well known to those skilled in the art and need not be elaborated upon in more detail at this time.

Figure 3:
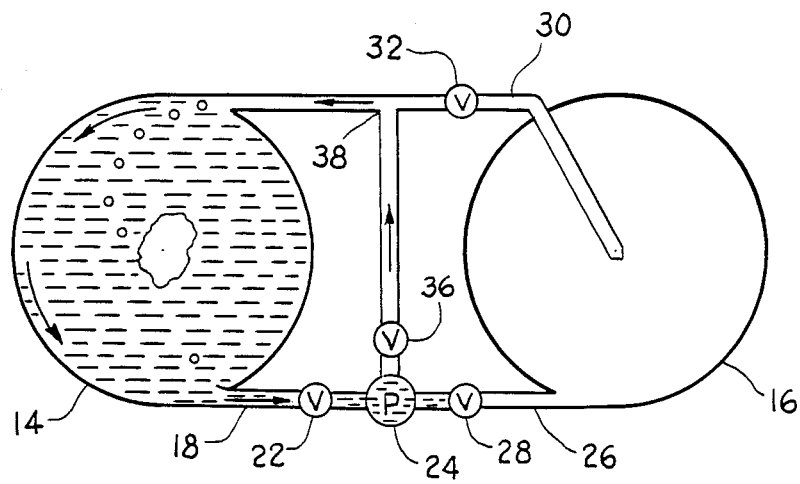
FIG. 3 is a schematic plan view of the vortex motion phase separator of the invention before the initial operation.
Figure 4:
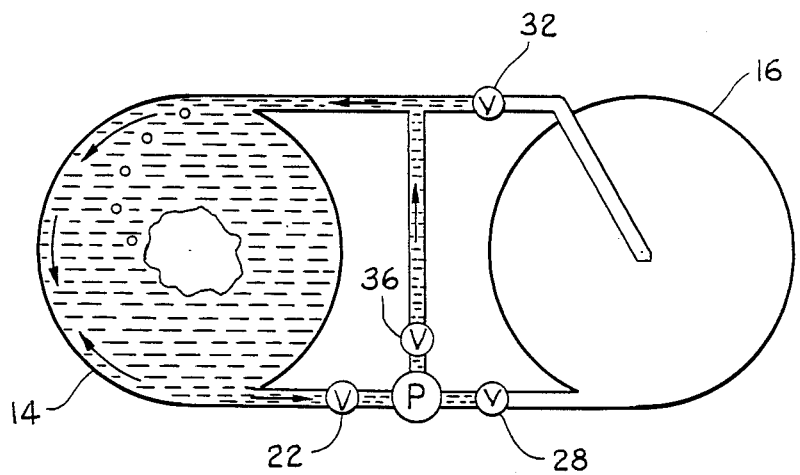
FIG. 4 is a view similar to FIG. 3 showing the initial stage of operation of the invention.
Figure 5:
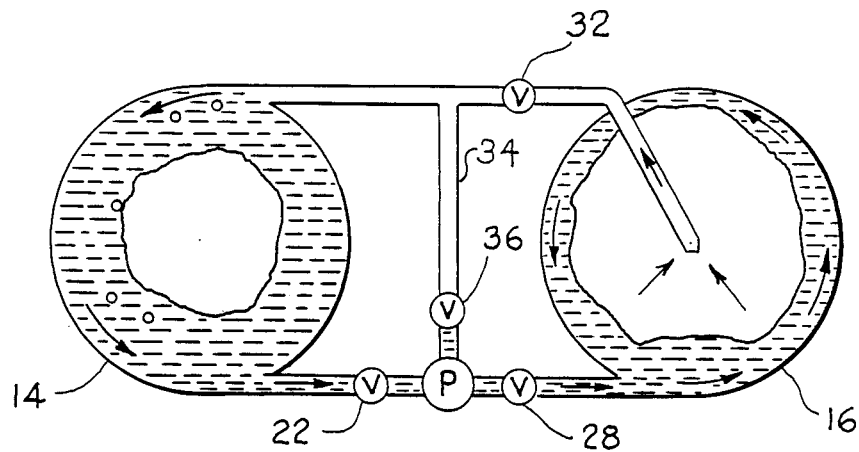
FIG. 5 is a view similar to FIG. 3 illustrating the final stage of separation.
Figure 6:
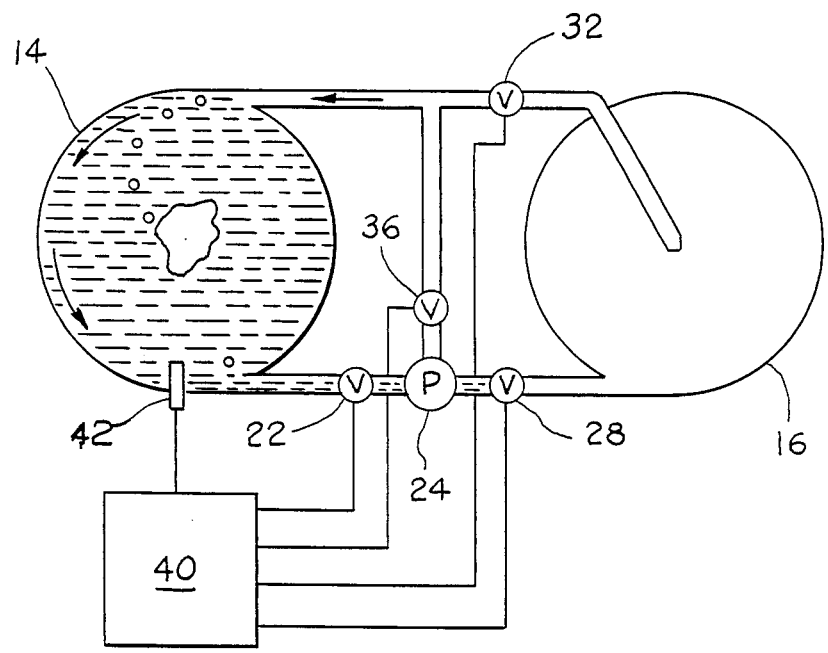
FIG. 6 is a view similar to FIG. 3 illustrating control apparatus for controlling the operation of the invention.

Referring now to FIGS. 3-6, the operation of the invention to separate a liquid from the vapor and to transfer such liquid from a sender tank into a receiver tank will be described. Within sender tank 14, as seen in FIG. 6, a velocity measuring device 42 is inserted within sender tank 14 for measuring the velocity of the liquid within sender tank 14. Movement of the liquid within sender tank 14 causes the velocity sensor 42 to generate a signal which is transmitted to a controller 40. Controller 40 may be a computer or other automated means for activating the various control valves of the invention when the velocity of the liquid within the sender tank achieves a predetermined value. As seen in FIG. 3, when the transfer operation is first initiated, the control means 40 operates to open first control valve 22 and fourth control valve 36, while at the same time closing second control valve 28 and third control valve 32, and activates motor 23 to begin the pumping operation. As pump 24 begins its operation, it draws a mixture of the liquid and the vapor from within sender tank 14 through first duct 18 to pump 24, whereupon the mixture of liquid and vapor is then directed through the fourth duct 34 and a portion of third duct 30 back into sender tank 14 at a tangent thereto. The continued operation of pump 24 in this mode creates a swirling vortex of the liquid and the vapor within sender tank 14 and the velocity of the mixture continues to increase.

As the velocity of the vortex of swirling liquid and vapor continues to increase, the liquid (having a heavier consistency than the vapor) is thrown by centrifugal force against the inner surface of tank 14 while the lighter less massive vapor tends to remain near the center of the vortex, and accordingly, the center of sender tank 14. After the controller 40 through its sensing device 42 determines that the speed of the mixture within sender tank 14 is sufficient to assure substantial separation between the vapor and the liquid, controller 40 operates to close control valve 36 and to open control valves 28 and 32 while continuing to operate pump 24. Thus, pump 24 pumps the liquid which has been separated from its vapor by centrifugal force within sender tank 14 through first duct 18 and second duct 26 into the receiver tank 16. The liquid within the receiver tank continues to swirl in a vortex driven by pump 24 continuing to operate. Thus, the liquid transferred from the sender tank 14 into the receiver tank 16 tends to fill receiver tank 16 from the outside in, thereby compressing any vapor left within receiver tank 16.

Such vapor is then exhausted from receiver tank 16 through the third duct 30 whereupon such vapor is transported to the sender tank where it continues to drive the vortex within the sender tank as the liquid within sender tank 14 continues to be pumped or exhausted therefrom and transferred to the receiver tank 16. The velocity measuring device 42 will determine when substantially all of the liquid has been transferred from the sender tank 14 into the receiver tank 16 and will transmit a signal to controller 40. When controller 40 determines from the signal it receives from sensor 42 that the transfer of the liquid is substantially complete, controller 40 closes first valve 22 and second valve 28 and third valve 32 and ceases the operation of pump 24.

While a specific form of the invention has been shown herein, which comprises an automatic operating control means, it is to be understood that operation of the control valves may be manually or remotely. The valves themselves may be operated through solenoids or the like or they may be operated manually by astronauts in a spaceship.

Furthermore, while a velocity sensor has been illustrated and described herein, it is to be understood that other sensing means could be used to sense the movement of the liquid and its separation from the vapor for providing the information necessary to determine the proper time for opening and closing the control valves.

It also is to be understood that the opening and closing of the control valves may be on a preset timer system which operates the separator of the invention on a predetermined timed schedule.

It also is to be understood that the control valves may take any common form, that is, they may be ball valves, gate valves or the like which are commonly known to those skilled in the fluidics art and the pump itself may be rotary, piston or the like. Any pump which will create the movement of the liquid and the gases or vapors necessary to the invention's proper operation may be used.

While a preferred embodiment of the invention has been described using specific terms, these terms and this description are for illustrative purposes only, and it is to be understood that changes and variations may be made in the invention as described and illustrated herein without departing from the spirit or the scope of the following claims.

We claim:

1. A vortex motion phase separator for transferring a liquid in a zero gravity environment, comprising:
   (a) a rigid sender tank having a circular cross-section containing a mixture of vapor and a liquid;
   (b) a rigid receiver tank having a circular cross-section for receiving liquid from said sender tank;
   (c) a pump disposed between said sender tank and said receiver tank for moving said liquid;
   (d) a first duct, one end of which is tangentially connected to said sender tank and the other end of which is connected to the inlet side of said pump;
   (e) a first valve disposed within said first duct, adapted to regulate the flow of said mixture from said sender tank to said pump,
   (f) a second duct, one end of which is connected tangentially to said receiver tank and the other end of which is connected to the output side of said pump;
   (g) a second valve disposed within said second duct, adapted to regulate the flow of liquid from said pump to said receiver tank;
   (h) a third duct, one end of which is connected tangentially to said sender tank at a point spaced from the connection between said first duct and said sender tank and the other end of which opens adjacent the center of said receiver tank;
   (i) a third valve disposed within said third duct adapted to regulate the flow of vapor from said receiver tank to said sender tank;
   (j) a fourth duct, one end of which is connected to the output side of said pump, and the other end of which is connected to said third duct at a point between said sender tank and said third valve; and
   (k) control means for controlling the operation of said pump and said valves for creating a vortex flow of said mixture within said sender tank to exert a centrifugal force on said mixture, causing said liquid and said vapor to separate, with the liquid moving against the inside surface of said sender tank and thereafter to cause said liquid to flow through said first and second ducts to said receiver tank and to cause vapor within said receiver tank to flow from said receiver tank to said sender tank, thereby transferring said liquid from said sender tank to said receiver tank while separating said liquid from said vapor.

2. A vortex motion phase separator as set forth in claim 1, wherein said valves are opened and closed by electronic means.

3. A vortex motion phase separator as set forth in claim 1, wherein said pump has an impeller driven by an electric motor.

4. A vortex motion phase separator as set forth in claim 1, wherein means are provided within the sender tank for measuring the separation between the liquid and the vapor.

5. A vortex motion phase separator as set forth in claim 4, wherein said control means opens the first and fourth valves and closes the second and third valves upon initiation of a separation cycle and activates the pump to pump the mixture within the sender tank through the first duct, the fourth duct, and a portion of the third duct, back into said sender tank to create a swirling vortex of said mixture within said sender tank, said control means continuing this flow path until such time as the separation of the liquid and the vapor is detected, after a predetermined degree of separation between the liquid and the vapor is detected, said control means closes the fourth valve and opens the second valve to direct the liquid from said sender tank into said receiver tank.

6. A vortex motion phase separator as set forth in claim 1, wherein said control means comprises a timing mechanism for opening and closing said valves in accordance with a predetermined time schedule.

7. A vortex motion phase separator as set forth in claim 4, wherein said measuring means comprises a device for measuring the velocity of the swirling mixture within the sender tank.

* * * * *